US012698648B2

(12) United States Patent
Müller et al.

(10) Patent No.: US 12,698,648 B2
(45) Date of Patent: Aug. 4, 2026

(54) DOOR LOCK MODULE FOR AN INTERIOR AIRCRAFT DOOR AND AIRCRAFT DOOR LOCK WITH DRIVE

(71) Applicants: Diehl Aviation Laupheim GmbH, Laupheim (DE); Diehl Aviation Gilching GmbH, Gilching (DE)

(72) Inventors: Björn Müller, Hamburg (DE); Florian Zager-Rode, Buxtehude (DE); Oliver Schumann, Gilching (DE)

(73) Assignees: Diehl Aviation Laupheim GmbH, Laupheim (DE); Diehl Aviation Gilching GmbH, Gilching (DE)

( * ) Notice: Subject to any disclaimer, the term of this patent is extended or adjusted under 35 U.S.C. 154(b) by 288 days.

(21) Appl. No.: 17/940,213

(22) Filed: Sep. 8, 2022

(65) Prior Publication Data

US 2023/0082864 A1    Mar. 16, 2023

(30) Foreign Application Priority Data

Sep. 10, 2021    (DE) ..................... 10 2021 123 495.6

(51) Int. Cl.
*E05B 47/06*        (2006.01)
*B64D 11/02*        (2006.01)
(Continued)

(52) U.S. Cl.
CPC .......... *E05B 47/0012* (2013.01); *B64D 11/02* (2013.01); *E05B 17/2038* (2013.01); *E05C 1/12* (2013.01); *E05B 2047/0017* (2013.01);

*E05B 2047/0023* (2013.01); *E05B 2047/0068* (2013.01); *E05B 2047/0069* (2013.01)

(58) Field of Classification Search
CPC ......... Y10T 292/1021; Y10T 292/1028; E05B 17/2038; E05B 47/0012
See application file for complete search history.

(56) References Cited

U.S. PATENT DOCUMENTS

| | | | | |
|---|---|---|---|---|
| 4,395,063 | A * | 7/1983 | Bianco | .................... E05B 55/00 |
| | | | | 292/169.21 |
| 6,318,138 | B1 * | 11/2001 | Mathews | ............ E05B 47/0012 |
| | | | | 70/279.1 |

(Continued)

FOREIGN PATENT DOCUMENTS

| | | | | |
|---|---|---|---|---|
| CN | 106968547 A | * | 7/2017 | ............. E05B 65/10 |
| CN | 107100512 A | * | 8/2017 | |

(Continued)

*Primary Examiner* — Carlos Lugo

(74) *Attorney, Agent, or Firm* — Laurence A. Greenberg; Werner H. Stemer; Ralph E. Locher

(57) ABSTRACT

A lock module for a door in an aircraft has a lock with a blocking element and a non-self-locking drive for moving the blocking element. A blocking sensor detects a blocked position and an unblocked position of the blocking element. A control unit receives a blocking signal from the sensor and activates the drive based on the blocking signals of the blocking sensor(s). A module portion of the door leaf has at least the lock, the drive, and the blocking sensor structurally integrated therein. There is also described a door for the space with a lock module where the door leaf of the door contains the module portion, and a space of an aircraft which is closed by the door.

14 Claims, 8 Drawing Sheets

(51) Int. Cl.
    *E05B 17/20*         (2006.01)
    *E05B 47/00*         (2006.01)
    *E05C 1/12*          (2006.01)

(56)           References Cited

U.S. PATENT DOCUMENTS

| | | | |
|---|---|---|---|
| 8,494,680 B2 * | 7/2013 | Sparenberg | E05B 47/026 |
| | | | 292/144 |
| 11,377,877 B1 * | 7/2022 | Butler | E05B 59/00 |
| 11,674,333 B2 * | 6/2023 | Milligan | E05B 63/0052 |
| | | | 292/201 |
| 11,739,583 B2 * | 8/2023 | Sorice | E05F 15/73 |
| | | | 49/25 |
| 2021/0363811 A1 * | 11/2021 | Subramanian | E05B 65/0035 |

FOREIGN PATENT DOCUMENTS

| | | | | | |
|---|---|---|---|---|---|
| CN | 111593962 A | * | 8/2020 | ......... | E05B 47/0012 |
| DE | 102018113132 A1 | | 12/2019 | | |
| FR | 2665476 A1 | * | 2/1992 | | |
| JP | 2003097108 A | * | 4/2003 | | |
| RU | 2383930 C2 | * | 3/2010 | ........... | B64C 1/1407 |
| WO | WO-8704213 A1 | * | 7/1987 | | |
| WO | 9934079 A1 | | 7/1999 | | |
| WO | 2019228594 A1 | | 12/2019 | | |

* cited by examiner

DOOR LOCK MODULE FOR AN INTERIOR AIRCRAFT DOOR AND AIRCRAFT DOOR LOCK WITH DRIVE

CROSS-REFERENCE TO RELATED APPLICATION

This application claims the priority, under 35 U.S.C. § 119, of German Patent Application DE 10 2021 123 495.6, filed Sep. 10, 2021; the prior application is herewith incorporated by reference in its entirety.

FIELD AND BACKGROUND OF THE INVENTION

The invention relates to such doors for spaces in aircraft which are closable and lockable. Corresponding spaces with corresponding doors are, in particular, on-board toilets or washrooms, also called lavatories, but also shower rooms, washrooms and bathrooms or other spaces or monuments in aircraft which have a closable and lockable door.

A door system having a folding door is disclosed in DE 10 2018 113 132 A1 and its counterpart WO 2019/228594 A1. The double-wing toilet door is configured as a foldable toilet door with a first and a second door panel. The door panels are connected together via hinges. The toilet door has a pin on the first door panel, the folding door being pivotably fastened by said pin. In order to be able to open and close the folding door, the second door panel of the folding door has a guide device which is moved along the door opening region. The movement of the toilet door between the closed and open position, and the locking and unlocking, take place via an electromotive actuating device. To this end, a linear actuator which is operated by an electric motor acts on the first door panel of the folding door via a carriage which is coupled to the linear actuator. An operating unit which is integrated in the door frame is also provided as a further component of the actuating device. The operating unit has in each case a sensor unit which may be operated on the toilet inner face and the toilet outer face and which has in each case two infrared sensors integrated in the door frame, flush with the surface thereof.

Alternatively, it is also known from practice to integrate two sensor units on the toilet inner face and one sensor unit on the toilet outer face in the door frame, flush with the surface thereof. Both infrared and capacitive sensors may be used.

SUMMARY OF THE INVENTION

It is accordingly an object of the invention to provide an aircraft door which is overcomes a variety of disadvantages of the heretofore-known devices and methods of this general type and which provides for an improvement relative to the above-mentioned doors for spaces in aircraft.

With the above and other objects in view there is provided, in accordance with the invention, a lock module for a door for a space of an aircraft, wherein the door has a door frame and a door leaf which is movable between an open position unblocking the door frame and a closed position closing the door frame, the lock module comprising:

a lock having a mechanical closing element mounted for movement into a closing position in which the door leaf is held in the closed position and for movement into an opening position in which the door leaf is enabled to be moved out of the closed position;

said lock having a blocking element mounted for movement into a blocked position in which said closing element is held in the closing position and into an unblocked position in which said closing element is enabled to be moved out of the closing position; and said lock having a non-self-locking drive which is coupled in terms of movement at least to said blocking element in order to move said blocking element between the blocked position and the unblocked position;

at least one blocking sensor for detecting the blocked position and the unblocked position of the blocking element and for generating a corresponding blocking signal;

a control unit connected to said at least one blocking sensor and said drive, said control unit being configured to activate said drive based on the blocking signal of said at least one blocking sensors; and the door leaf having at least one module portion in which said lock, said drive, and said blocking sensor are structurally integrated.

The lock module is configured for installation or fitting in a door for a space of an aircraft. In this case, the invention is based on the fact that the intended door has a door frame and a door leaf. The door leaf is movable between an open position unblocking the door frame and a closed position closing the door frame. The open position serves the purpose of permitting individuals to enter and leave the space, and thus the door or the space is open. The closed position serves to close the space by means of the closed door. The term "door frame" is to be understood here broadly or functionally and denotes any structure which surrounds a door opening to be closed by the door leaf. Thus the door frame may be a physical part which is actually inserted specifically for this purpose into a wall of the space in order to fix, to guide etc., the door leaf. However, the door frame may also be formed, for example, by an imaginary sub-portion of the wall of the space and thus strictly speaking is not able to represent per se a separate structural part which might be provided specifically for this purpose.

The lock module contains a lock. The lock as a whole is responsible in terms of its functionality for closing and locking the door.

The lock contains a mechanical closing element. The closing element is disposed to be moved or is able to be changed in position—relative to the door leaf or the module portion thereof see below—and in this sense is able to be moved into a closing position. If the closing element is in the closing position, the door leaf is held in the closed position. It is to be understood thereby that the door or the door leaf is held closed in the door frame, i.e., at least is not able to be opened. A mechanical, for example positive, holding, for example on the door frame, is not absolutely necessary therefor. The closing element is also able to be moved by a mechanical movement or an actual movement changing the position relative to the door leaf into an opening position which is different from the closing position. In this opening position the door leaf is able to be moved out of the closed position. Thus the door may be opened and the door leaf moved out of the door frame. In particular, the door leaf may be moved in this manner into the open position. The closing element is designed, in particular, in the form of a bolt which is displaceable in a linear manner, in particular along the longitudinal axis of extension thereof. The closing element is implemented, in particular, by a lock tongue on the door leaf of a single-wing door, said lock tongue in the closing position engaging in a lock receiver in the door frame. In the case of a folding door, the closing element is held, in particular, on one of the partial leaves and travels into a lock receiver on the adjacent door leaf for the closing thereof.

The lock contains a blocking element, in particular in the form of a bolt, which is displaceable in a linear manner, i.e., in translation, in particular along the longitudinal axis of its extension. The blocking element, in particular, is a mechanical blocking element. Alternatively, this blocking element, in particular, may also be designed magnetically or electrically. The blocking element is also mechanically movable and in this sense is able to be moved into a blocked position—in particular, relative to the door leaf or module portion and/or relative to the closing element which is located in the closing position. In the blocked position, the closing element is held in the closing position by the blocking element. The expression "held in the closing position" may also mean that the closing element is prevented from being able to be moved out of the closing position, for example, by inhibiting/preventing a movement of a door handle that is provided therefor. A direct mechanical action on the closing element is thus not absolutely necessary. The blocking element is also able to be moved into an unblocked position which is different from the blocked position, or is able to be moved mechanically therein so as to change the position. If the blocking element is in the unblocked position, the closing element is able to be moved out of the closing position and thus, in particular, is able to be moved into the opening position.

The lock contains a non-self-locking drive, in particular a linear drive. This linear drive is coupled in terms of movement at least to the blocking element. By the coupling of the movement, the moving or working drive may move the blocking element between the blocked position and the unblocked position. To this end, the drive has a fixing end and an output end. In particular, the fixing end is rigidly fastened to the door leaf or module portion and the output end is, for example, a spindle nut of a linear drive in the form of a spindle drive. The output end, in particular, is rigidly fastened to the blocking element, i.e., an element which is displaceable therewith in a linear manner.

The lock module contains at least one blocking sensor. This blocking sensor is designed to detect at least the blocked position and the unblocked position, in particular also mechanical intermediate positions/locations of the blocking element, in the form of at least one blocking signal. The blocking sensor is, in particular, a position sensor for the blocking element, which detects the location or position thereof continuously/at a plurality of discrete positions. Alternatively, two blocking sensors are provided, in particular in the form of end position sensors/switches which, on the one hand, detect the blocked position and, on the other hand, the unblocked position in, for example, binary form (position reached: yes/no). The blocking signal is thus, in particular, a continuous position signal of the blocking element or even a binary yes/no signal for the respective end position of the blocking element in the blocked or unblocked position.

The lock module includes a control unit. The control unit is connected by signal technology to the blocking sensors and the drive and is designed to activate the drive at least on the basis of the blocking signals of the blocking sensors. A corresponding command therefor may be transmitted in any manner to the control unit.

The lock module comprises at least one module portion of the door leaf. The module portion is a physical sub-region of the door leaf, alternatively also the entire door leaf. At least the lock, the blocking sensor and the drive, optionally also the control unit, are structurally integrated in the module portion. In other words, the lock, blocking sensor and drive, optionally also the control unit, are structurally integrated in the door leaf.

Due to the characteristic of the drive, namely being designed not to be self-locking, the blocking element may also be operated at any time manually, since this blocking element and the drive are actuated at the same time by the manual movement of the blocking element. The drive serves for assisting or implementing an optional motorized movement of the blocking element. Thus, in particular, a touchless functionality of the blocking element may be implemented by the drive being controlled by means of the control unit relative to a signal of a touchless sensor. The lock module is designed, in particular, such that a locking of the lock (blocking element in the blocked position) is only possible from the interior of the space, in particular only when the door leaf is in the closed position. Nevertheless, an emergency unlocking from outside the space may be possible, for example by a corresponding activation of the control unit or even a concealed or hidden manual interface of the blocking element, which is accessible from outside the space, for example to the flight crew of the aircraft. In particular, a cable transition/guide is provided on the door between the door frame/surrounding wall and the door leaf. In particular, such a transition is provided where the door leaf is rotatably mounted on the door frame.

A comparable mechanical interface, as on the blocking element, may alternatively or additionally be provided on the closing element in order to be able to move this closing element at any time manually between the closing position and the opening position. Such an interface is generally accessible both from inside and from outside the space, since the door is designed to be opened and closed from both sides. However, opening from outside the space is inhibited when the blocking element is in the blocked position. A motorized driving of the closing element by the drive, however, is also optionally possible. Thus a further automation of the door may be achieved.

According to the invention, therefore, an electromechanical locking mechanism is produced. The electromechanical locking mechanism automates a mechanical door lock. A basic lock concept may thus be maintained in principle and simply complemented by a non-self-locking linear actuator, for example a linear stepper motor. Both the aforementioned and further electronic components, as far as possible all electronic components, (see below) are arranged where possible in the door leaf/module portion. Thus the need for integration for different spaces, which are designed to be equipped with such a door leaf, may be as minimal as possible.

In accordance with an advantageous feature of the invention, a touchless door or a touchless door lock may be implemented, in particular a touchless lavatory or washroom.

In a preferred embodiment, the lock module also has a door handle, preferably on the door leaf. The door handle is coupled in terms of movement, in particular mechanically coupled, to the closing element. In principle, the door handle is in a resting position. In this resting position, no force is exerted by the door handle on the closing element. In particular, the door handle may be pushed by manual operation by a user, by this door handle being rotated about a rotational axis. The door handle thus is able to be moved/has been moved into an actuating position. By the coupling of the movement of the door handle and the closing element and the corresponding actuation of the door handle, the closing element is pulled out of the closing position into the opening position. Thus the closing element is in the opening position when the door handle is in the actuating position. The door leaf is thus unblocked and may be moved out of the closed position into the open position. When the door handle is released, it returns from the actuating position into the resting position thereof. Thereupon the closing element returns into the closing position, for example assisted by a spring. Moreover, when the door is closed, the closing element may be automatically pushed back, due for example to a lead-in chamfer and the corresponding lead-in on the door frame, or the lock receiver. As soon as the door has "clicked shut" the closing element returns to the closing position thereof; the door is then once more held in the closed position.

The door handle has a receiver in which the blocking element may be inserted, and in which the blocking element is inserted in the blocked position. This position of the blocking element corresponds to a first end position of the blocking element. This position may be reached, for example, by the blocking element bearing against a stop of the receiver of the door handle. By the insertion or a corresponding positive engagement in the receiver and thus of the door handle, a rotation of the door handle about the rotational axis and thus the actuation is prevented or inhibited. By the door handle not being able to be actuated, the closing element is prevented from being able to be moved out of the closing position by the assistance of said door handle. Thus in this manner the door leaf is also prevented from being able to be moved out of the closed position.

By moving the blocking element into the unblocked position, the blocking element leaves the receiver. A rotational movement of the door handle about the rotational axis is possible, and thus the movement of the blocking element out of the lock receiver and the opening of the door are possible.

In this embodiment, the non-self-locking drive is coupled in terms of movement both to the blocking element and also to the closing element. By actuating the drive, the closing element is able to be moved in a motorized manner to and fro between the blocked position and the unblocked position. Moreover, the closing element may be moved from the closing position into the opening position and also unblocked from the opening position, so that the closing element may return, or returns, independently into the closing position again, namely by its above-mentioned spring characteristic.

The coupling of the movement of the drive and the blocking element is implemented as follows: the drive has a fixing end and an output end. The fixing end is fixedly anchored in the door leaf. Moreover, a spindle with a spindle nut, which is rotatable relative to the fixing end, is provided so that the spindle nut forms the output end which is movable relative to the door leaf. The spindle nut in turn is fixedly connected to the blocking element. A rotation of the spindle thus always leads to a forced movement of the output end and thus of the blocking element relative to the door leaf.

The blocking element is freely movable inside the, or relative to the, closing element between the above-described first end position and the second end position described further below, so that this closing element may move into or out of the receiver. Thus with a movement of the blocking element between these two end positions, there is no transmission of force from the blocking element to the closing element. If, however, the spindle nut and thus the blocking element are moved further, a driver element on the blocking element engages behind a counter element on the closing element and entrains this counter element therewith. The position in which the driver element on the blocking element engages behind the counter element on the closing element is the second end position of the blocking element. With a further movement of the blocking element, there is a transmission of force to the closing element so that the closing element is pulled out of the closing position until it has finally left the lock receiver and the door leaf is unblocked in order to be moved out of the closed position. An actuation of the door handle is not necessary here. Both the locking and unlocking of the door and the unblocking of the door leaf takes place in a motorized manner by actuating the drive.

The blocking element may also have an additional manual operating element, for example in the form of an operating knob. A user may act manually on the operating element in order to move the blocking element and thus lock or unlock the door manually. The operating element may adopt two different positions, a user also being able to identify thereby whether the door is locked or unlocked. In a first variant A the operating element runs freely relative to the blocking element. If the blocking element is thus displaced further in a motorized manner by the drive, the operating element does not follow this movement and continues to display the same "unlocked" position to a user. In a second variant B, however, the operating element is fixedly connected to the blocking element and thus also follows the corresponding movement of the blocking element by a further displacement.

In a preferred embodiment, the door leaf has at least two, in particular exactly two, partial leaves. The partial leaves are connected together in an articulated manner by one respective central hinge. The closing element is designed in the closing position to fix the partial leaves, in particular in each case two of the partial leaves, mechanically and immovably relative to one another, so that a movement on the central hinge is inhibited. The closing element is thus designed to hold the door leaf in the closed position, i.e., to inhibit a movement into the open position. The module portion is arranged, in particular, on exactly one of the partial leaves. In particular, this refers to the "inner" partial leaf, namely the partial leaf which is rotatably mounted on the door frame, in particular specifically in the case of a double-wing folding door leaf. The electrical supply (cable transition) as a result is particularly simple, since it has only to be guided from the door frame via a joint to the inner partial leaf. The closing element, for example in the form of a blocking bolt/locking bolt, is then also movably fixed or mounted on the relevant partial leaf and in the closing position travels into a lock receiver in or on the adjacent or other partial leaf. A mechanical locking of the door is thus only required on the central hinge, and a locking of the door leaf/partial leaf on the door frame by means of an additional bolt element between one of the partial leaves and the door frame, in order to hold the door leaf in the closed position, is not necessary and in particular even actually omitted.

In a preferred variant of this embodiment, therefore, the lock module does not contain a bolt element which acts between at least one of the partial leaves and the door frame and which might be designed to hold the door leaf on the door frame in the closed position.

In a preferred embodiment, the closing element and the blocking element are identical. Both elements thus coincide: it is a single element with a dual functionality. The blocked position thus corresponds to the closing position and the unblocked position corresponds to the opening position.

The lock module thus contains, in particular, only a single blocking bolt/locking bolt which is movable relative to the door leaf and fulfils both functionalities (lock/closing element, on the one hand, and locking, on the other hand). This solution is advantageous, in particular with at least one or specifically a double-wing folding door leaf of a folding door, since this may be opened (open position) and closed (closed position) without any type of door handle/latch, simply by pushing/pulling in the region of a central hinge or the single central hinge and, for example, latched in both positions. A corresponding latching force simply has to be overcome, but a mechanical closing element does not have to be released. The same might also be conceivable for a rotating door when this is "latched" in the closed position, for example by means of a corresponding closure element. Such a closure element is constructed, in particular, in the manner of a ball catch.

In a preferred embodiment, the door leaf is a single leaf. The closing element in this case is designed in the closing position to fix the single leaf in the closed position relative to the door frame, so that a movement of the door leaf out of the closed position relative to the door frame is inhibited. The door in this case is a single-wing door which is rotatably attached, in particular with a rotary hinge, to the door frame. The lock or closing element is held on the single leaf, in particular a blocking bolt/locking bolt is displaceably mounted on the single leaf and in the blocked position travels into a lock receiver on the door frame.

In a preferred embodiment, the lock module contains at least one external sensor for identifying a door status. The external sensor is designed to identify a door status and to output an external signal correlated with the door status. In particular, the external sensor has an aircraft-specific interface for the output of the aircraft-specific external signal which represents or contains information correlated with the door status. "Aircraft-specific" is to be understood to mean here that this signal has to correspond to specific requirements in the aircraft and is processed further in the aircraft. In particular, the signal as such is absolutely necessary in the aircraft in order to activate the elements already present, for example. An example thereof is the "door locked" signal of a washroom door, in order to activate an "occupied sign" for the washroom, and to control the washroom lighting. This signal is conventionally generated by a "door switch" installed in the door frame.

While the external sensor is structurally integrated in the module portion, it is not connected by signal technology to the control unit. Relative to the door, the external sensor thus forms a dedicated or separate system or is part of a dedicated signal path which, at least regarding the lock module, has no contact points therewith in terms of signal technology. The external sensor or the sensor output signal thereof is supplied for a different use in the aircraft, away from the door leaf. In particular, the external sensor serves to detect a door status independently of the lock module and to communicate this to the aircraft. The door status is, in particular, the mechanical position of the door leaf (closed position/open position) or the current position of the closing element and/or the blocking element. In this case, it should be emphasized that it is a sensor system which is separate or redundant regarding the door module and which works in addition to or independently from, for example, the blocking sensor. The external sensor is thus, in particular, a dedicated end position switch, as a replacement for a standard "door switch" known from practice in the wall/in the door frame, which in conventional aircraft doors identifies the insertion of a blocking bolt in the door frame, the locking of the door being concluded therefrom, for example. This results in the advantage that this sensor is also integrated in the door leaf and thus a sensor system outside the door leaf is not necessary, which means a greater level of integration and thus a simplification of the system.

In a preferred embodiment, the lock module contains at least one command sensor which is connected by signal technology to the control unit. This command sensor is designed to detect a door command correlated with the lock module. The command sensor is structurally integrated in the module portion. A door command is any door command which is directed to the door or the functionality thereof, in particular a movement command in order to move the door leaf in a motorized manner, in particular to change between the open position and closed position. A further door command is, in particular, such a command which is directed to the closing element and/or blocking element in order to move these elements and thus to unblock the closing element and thereby the door (opening position) for opening or to prevent this (closing position) or to move the blocking element and thus to lock (blocked position) or to unlock (unblocked position) the door or the lock. In particular, in combination with a motorized door drive for moving the door leaf, this results in further possibilities for door automation, in particular a fully touchless operation of all functionalities of the door (moving, unblocking, holding closed, locking, unlocking).

Alternatively or additionally, the lock module also contains at least one additional sensor which is connected by signal technology to the control unit and which is also structurally integrated in the lock module. The additional sensor is designed to detect a door status or the door status. Corresponding door statuses have already been described above in connection with the external sensor. In contrast to the above, however, the door status is now supplied to the control unit and may be used therein for the direct control of the door module. Thus, for example, misuse may be detected and avoided, such as for example an attempt to bring the blocking element into the blocked position whilst the door leaf is in the open position.

In a preferred variant of this embodiment, it is assumed that the blocking element—as already mentioned above as optional—and/or the closing element has a manual operating element for manually changing the position thereof (moving the blocking element at least between the blocked position and the unblocked position). The command sensor is thus arranged in the immediate vicinity of the operating element. "Immediate" means that a user who sees the operating element could also touch the command sensor, and practically also find it at the same place, for example directly adjacent thereto, at only a very short distance (at the scale of the dimensions of the operating element/command sensor). For a user of the door, therefore, a particularly intuitive operation of the blocking element may be carried out by means of the command sensor—in particular working in a touchless manner. This is because the operator will tend to want to operate the blocking element by hand on the operating element, and immediately identifies intuitively the possibility, which is available immediately at practically the same operating location, of operating the blocking element (touchlessly) via the command sensor as an alternative. Thus an alternative possibility of operating the door is provided to the user. Thus it may be assumed that the user may disregard the manual operation of the operating element and use the command sensor.

In a preferred embodiment, the lock module contains at least one display element. This display element is designed to display status information correlated with the lock module. The display element is also structurally integrated in the module portion and is connected by signal technology to the control unit. The status information is, in particular, the current position of the blocking element and/or the closing element. The display element—if present—is integrated, in particular, in the command sensor; in particular, a touchless command sensor with an integrated display element ("touchless sensor with indication") is implemented thereby. Such a display element enhances the ease of use of the lock module or the door.

In a preferred embodiment, the drive is also coupled in terms of movement to the closing element and is designed to move this closing element at least out of the closing position into the opening position. Optionally, a driven opposing movement is also possible (from the opening position to the closing position); alternatively or additionally, however, the opposing movement may also be carried out automatically, in particular assisted by a spring. This solution may be optionally provided for separate blocking elements; if the two elements coincide (see above) this solution is produced automatically or by implication. Thus a motorized and touchless operation of the closing element is also possible.

In a preferred embodiment, the control unit has at least one emulation interface with the aircraft. The control unit is also designed to provide at this interface an aircraft-specific emulation signal which is correlated with the door, in particular in the sense of the above-mentioned external signal which is generated on the basis of the data available in the control unit. As a result, the possibility is provided to emulate or simulate the above-mentioned external signal. The above-mentioned external sensor is thus, in particular, no longer required and is simulated or the functionality thereof is represented by the control unit. From the point of view of the aircraft, however, the external signal required by the aircraft is still provided, but not by the external sensor actually provided therefor. The entire system is further simplified thereby. In particular, the above-mentioned "door switch" may be replaced in a sensorless manner, so to speak.

The object of the invention is also achieved by a door for a space of an aircraft, whereby the door has a door frame and a door leaf, wherein the door has the lock module according to the invention and the door leaf contains the module portion.

The space, door, door frame and door leaf thus correspond to the objects already mentioned above in connection with the lock module.

The door and at least some of the possible embodiments thereof and the respective advantages have already been described expediently in connection with the lock module according to the invention.

In a preferred embodiment, the door contains a door drive. The door drive is designed to move the door leaf between the open position and the closed position. A corresponding door drive has already been described above. This results in all of the possibilities already mentioned above of, in particular, a touchless door operation or automation.

With the above and other objects in view there is also provided, in accordance with the invention, a space of an aircraft comprising a wall surrounding an interior of the space, wherein the wall contains at least one door according to the invention. In particular, the space or the interior thereof may be entered or left by individuals through the open door. The door, in particular, may be closed and locked.

The space, interior, wall, door etc. correspond to the objects already mentioned above in connection with the lock module/the door.

The space and at least some of the possible embodiments thereof and the respective advantages have already been described expediently in connection with the lock module according to the invention and the door according to the invention.

The space, as already indicated above, in particular is a monument, a shower, a bath, a toilet, a lounge area which may be closed off, compartment or the like, of an aircraft. In a preferred embodiment, the space is a washroom, also an on-board toilet or lavatory, of an aircraft.

The invention is based on the following findings, observations or considerations and also comprises the following embodiments. The embodiments in this case are also called "the invention", partially for the sake of simplicity. The embodiments in this case may also be parts or combinations of the above-mentioned embodiments or correspond thereto and/or optionally also include embodiments previously not mentioned.

The proposed solution permits a touchless operation of a door lock. The proposed solution permits an electromechanical locking and unlocking (blocking element). In the case of an application of a single-wing door, the lock tongue (closing element) may be additionally retracted in order to permit a door opening (optionally motorized door drive). The locking and unlocking is triggered by touchless interaction with at least one proximity sensor (command sensor). The door may always be manually locked and unlocked (manual operating element). As is commonplace today, the crew may lock and unlock the door outside the area to be locked (from outside the space).

The locking bolt (blocking element) is moved via a non-self-locking drive which is installed in the door lock. To this end, the door lock in the inner door leaf (in the case of folding doors, the door leaf which is rotatably attached to the door frame) is electrically operated (drive). A cable transition ensures the power supply and communication to the controller (control unit) and optionally the aircraft.

Different sensors detect the current locking status (blocking sensors/additional sensors, for example position of locking bolts), the closed door position (additional sensor so that the door is only locked in the closed status), and/or the travel speed (for example Hall sensor motor as blocking sensor and/or additional sensor). Optionally, a dedicated end position sensor (external sensor) may identify the locked position in order to communicate the corresponding signal to the aircraft (used for light control and occupied sign in the cabin; replaces door switch in wall).

The concept comprises:
1. Electromechanical locking mechanism in the inner door leaf consisting of
   a. Mechanical door lock (closing element/blocking element: bolt with mechanical interface for manual use)
   b. Non-self-locking drive
   c. Two end position switches (blocking sensor: locked and unlocked signal)
   d. Dedicated door locked sensor for aircraft (cabin management system: lighting and occupied sign)
2. Lock receiver for bolt in outer door leaf
3. Cable transition
4. Door closed sensor (additional sensor, for example reed sensor with magnet)
5. Optional: command sensor with display element. Touchless switch with indication in inner door leaf.

The proposed solution is characterized, in particular, by the following features:

1. The operation takes place optionally in a touchless manner and enhances the hygiene conditions in the aircraft cabin.
2. The system fulfils aircraft-specific safety standards. The door lock may always be manually operated (manual operating element), whereby an evacuation is ensured (leaving the interior of the space).
3. The mechanical door lock may be markedly simplified (closing element, blocking element, in particular no further mechanically movable parts required):
   a. The door switch (external sensor, locked signal for aircraft, which is located in the wall) may be replaced by end position switches in the lock (blocking sensors, emulation, external sensor). Thus only one bolt (the closing element and blocking element coincide) is required for the locking, said bolt travelling into the second door leaf. A bolt (obsolete bolt element) which travels into the wall and triggers the door switch is not needed. The complex reduction gear in the mechanical door lock known from practice is completely dispensed with.
   b. The mechanical locking protection known from practice when the door is opened may be dispensed with and implemented by software (control unit, evaluation by additional sensor for the position of door leaf and blocking sensor). Previously, a spring-driven mechanism known from practice prevents the manual locking when the door is opened. This may be identified by the door closed sensor (additional sensor) and the end position switch (blocking sensors) and electromechanically prevented (control unit: door locks only when door is closed, or door unlocks automatically when door is not closed and door not unlocked).
4. An optional integration of the touchless switch in the door ensures intuitive operation of the door. The sensor is located in the vicinity of the conventional mechanical interface of the mechanical door lock (manual operating element). The sensor is rotated away from the user when the door is opened and is thus outside the field of view, whereby exclusively the touchless switch responsible for door closing is in the field of view of the user.
5. The solution permits a simplified integration in existing doors, since the electrical components are accommodated in the module portion and thus in the door (drive, in particular linear drive: linear motor, blocking sensors, additional sensors, external sensors, command sensors, display element: touchless switch). The need for integration in different monuments is significantly reduced.
6. The coupling of the drive to the mechanical door lock in the inner door leaf reduces the system complexity and costs due to a reduction in the number of components. The frictional resistance (non-self-locking) is minimal for manual use.

The novel system, or solution, is represented as a total concept as follows:

This solution integrates all of the relevant components of a touchless product in the door which should be installed outside the door according to current known practice. This provides numerous synergies and is preferred and cost-optimized for the line-fit market.

The concept permits the (simplified=cost effective) development of two products, "automatic door lock (only lock is automated)" and "touchless door and lock (door and lock are automated)", as well as an application in single-wing and folding doors. In particular, the concept "touchless door and lock" of a single-wing door may be implemented in this manner.

The energy and signal transmission between the door frame and door leaf (cable transition) and inside the door leaf permits this concept. The actual locking mechanism is simplified relative to conventional practice (=manual operation) since a reduction gear known from practice and a transmission of movement to a second bolt are not required.

The locking mechanism may be operated manually in a particularly simple manner. Generally used horizontal locking mechanisms may be reused in the context of the proposed solution. As is commonplace today, the locking mechanism is accessible to individuals on both sides. The access is arranged to be concealed, since this is generally only used by the crew. Thus the lavatory may be locked and unlocked manually from outside by the crew (taxi, take-off, landing preparation) or unlocked in an emergency. From the inside (interior) the lock may be manually operated as is commonplace today. As a result, with touchless use, the user has a visual and acoustic feedback (audible movement of the blocking element and of the manual operating element).

The touchless switch with indication (command sensor with display element) which initiates the door lock is now able to be found intuitively in the vicinity of the mechanical actuating element (manual operating element). When the door is opened (open position) this switch rotates out of the field of view, which is why with a possible "touchless door and lock" product, the touchless switches belonging to the door movement are exclusively in the field of view of the user.

The novel system, or solution, may be summarized again as follows:

The electromechanical locking mechanism automates the mechanical door lock. The general lock concept is maintained in principle, significantly simplified (complexity reduced) and complemented by a non-self-locking linear actuator (for example linear stepper motor). As far as possible, all further electrical components are placed in the door in order to make the need for integration in different lavatories as minimal as possible.

The concept for folding doors comprises:
1. Electromechanical locking mechanism in the inner door leaf consisting of
   a. Mechanical door lock
   b. Non-self-locking drive
   c. Min. 1 position sensor (locked and unlocked signal)
   d. Dedicated door locked sensor for aircraft (cabin management system: lighting and occupied sign)
   e. Receiver for bolt in outer door leaf.
2. Cable transition
3. Door closed sensor
4. Optionally: touchless switch with indication in inner door leaf.

The concept for single-wing doors (see also variants A and B of the exemplary embodiment) comprises:
1. Electromechanical locking mechanism in the single-wing door consisting of
   a. Mechanical door lock
   b. Non-self-locking drive
   c. Min. 1 position sensor (locked and unlocked signal)
   d. Dedicated door locked sensor for aircraft (cabin management system: lighting and occupied sign)
   e. Lock striker plate in wall
2. Cable transition
3. Door closed sensor 4. Optionally: touchless switch with indication in single-wing door.

The concept for single-wing doors (see also variant C of the exemplary embodiment) comprises:

1. Electromechanical locking mechanism in the single-wing door consisting of
   a. Mechanical door lock
   b. Integrated closure element
   c. Non-self-locking drive
   d. Restoring spring
   e. Min. 1 position sensor (locked and unlocked signal)
   f. Optional: dedicated door locked sensor for aircraft (cabin management system: lighting and occupied sign)
   g. Lock striker plate in wall
2. Cable transition
3. Door closed sensor
4. Optional: touchless switch with indication in the single-wing door.
5. Door switch in wall, when 1d is not selected (as is the case today in folding doors)
6. Door closure element (for example ball catch)
   a. Optional: attachment to drive for retraction
   b. Optional: retracting mechanism (for example electromagnet)

The concept for single-wing doors (see also variant D of the exemplary embodiment) comprises:

1. Electromechanical locking mechanism in the single-wing door consisting of
   a. Mechanical door lock
   b. Non-self-locking drive
   c. Restoring spring
   d. Min. 1 position sensor (locked and unlocked signal)
   e. Optional: dedicated door locked sensor for aircraft (cabin management system: lighting and occupied sign)
   f. Lock striker plate in wall
2. Closure element/door closure element (for example ball catch)
   a. Optional: coupled to electromechanical locking mechanism/attachment to drive for retraction
   b. Optional: decoupled; dedicated actuator for retraction/retracting mechanism (for example electromagnet)
3. Cable transition
4. Door closed sensor
5. Optional: touchless switch with indication in the single-wing door.
6. Door switch in wall, when 1d is not selected (as is the case today in folding doors)

The electromechanical locking mechanisms take into consideration the different types of door (single-wing door versus folding door) and different variants which are relevant in the case of the single-wing door (for the products "automatic door lock" or "touchless door and lock"). The electrification permits an adaptation and a reduction in complexity of the door lock principles (in particular in folding doors) known from practice. At least 1 position sensor (for example absolute position sensor or two end position switches) identify the locked position (blocked position) and unlocked position (unblocked position) for the control and status communication. A dedicated end position switch identifies the locked position, in order to communicate the corresponding signal to the aircraft (used for light control and occupied sign in the cabin; replaces door switch in the wall). The door switch in the wall could be also used in the solutions for single-wing doors since here a locking bolt travels into the wall. Alternatively, the status signals of the door may be transmitted via the control unit to the aircraft. The electromechanical locking mechanism contains, or is associated with, a receiver for the locking mechanism (locking bolt or lock tongue) in the wall (single-wing door) or in the opposing outer door leaf (folding door). The specific solutions for the different types of door and variants for the single-wing doors are described hereinafter and the differences presented in detail.

The cable transition ensures the signal communication and power supply between the door and wall.

The door closed sensor detects the closed door so that the lock actuator may be locked exclusively in the closed status. In the case of folding doors, here the additional locking protection may be replaced by software. Thus when the door is not closed an extended locking bolt (for example manually extended) could be identified, and the unlocking movement carried out.

This concept may be used in the products "touchless door and lock" and "automatic door lock". In this case, only the lock actuator or door lock actuator is replaced by the concept described herein. The door lock actuator is then connected to a central control unit of the products. A touchless switch with indication may optionally be integrated in addition to the interface (manual operating element) of the mechanical door lock in the inner door leaf in order to permit an intuitive operation.

The concept considers aircraft-specific characteristics such as, amongst other things, robustness, manual override according to CS-25, safety. The electromechanical locking mechanism may always be manually operated.

For folding doors which may be manually operated:

The door locks used in practice today are firstly described:

A locking bolt inhibits a folding up and thus an opening of the closed door. This locking bolt travels from the outer door leaf into the bolt receiver of the inner door leaf. The locking bolt may be moved by the lock knob via a reduction gear. A second bolt travels into the wall. A door switch, which provides the aircraft with a door locked signal (for the occupied sign and lighting of the lavatory controlled by the aircraft) is installed in this wall. The locking protection permits locking (displacement of the lock knob to the left) when it is pushed in through the outer door leaf. The unblocking of the locking takes place in the fully closed status (only then is locking expedient). A status indication displays the status in the public area (vacant versus occupied). The status in the area to be locked is displayed by the position of the door knob and a colored metal plate (red vs. green) which is displaced with the door knob. From the public area, the door may be manually opened by pushing via the push plate. In the area to be locked, the manual opening is possible by pulling on the handle. The locking may also be actuated from the public area via the manual override. To this end, the bolt which is covered and concealed by the flap may be made accessible and manually displaced.

For manually controllable single-wing doors:

A door lock which is used in practice for single-wing doors is constructed as follows:

A lock tongue holds the door in the closed position, both in the unlocked and in the locked status. The lock tongue is held by the receiver in the wall. The lock tongue may be retracted via actuation of the door handle on both sides and permit an opening of the door. If the single-wing door lock is locked by the lock knob, i.e., is pushed into a blocked position, a rotational movement of the door handle is blocked. At the same time, a movable part, which contains a magnet, in the lock tongue is moved in the direction of the wall. As a result, the door switch identifies the door locked signal. The door switch provides the aircraft with the door locked signal (for the occupied sign and lighting of the lavatory controlled by the aircraft). The lock tongue is mounted resiliently so that it is always pushed in the direction of the wall and is actively retracted by the door handle. A status indication shows the status in the public area (vacant versus occupied). The status in the area to be locked is displayed by the position of the door knob and a colored metal plate (e.g., red vs. green) which is displaced with the door knob. The locking may also be actuated from the public area via the manual override. To this end, the locking mechanism, which is covered and concealed by a flap, is made accessible and manually displaced.

The components are described hereinafter:

This applies to a folding door but the components described are also mainly used in the single-wing door. The design of the electromechanical locking mechanism is thus differentiated and the further components characterized below:

Electromechanical Locking Mechanism—Folding Door:

The electromechanical locking mechanism for folding doors is based on the following concept:

Mechanical door lock

Non-self-locking drive

At least one position sensor (locked and unlocked signal)

Dedicated door locked sensor for aircraft (cabin management system: lighting and occupied sign)

The folding door is attached on the one side (where the door hinge is attached) and may be pulled open on the handle. As a result, the central hinge moves into the space to be locked. The mechanical door lock is placed on the inner door leaf so that only a single cable transition (wall—inner partial leaf) is required.

A dedicated door locked sensor (for example a pushbutton) provides the door locked signal so that the door switch and the bolt travelling into the wall is dispensed with (see previous concept known from practice). The lock concept is simplified as a result.

At least one position sensor (for example two further end position switches) signal to the control unit the "locked" status (blocked position) and "unlocked" status (unblocked position). Mechanical pushbuttons, but also reed contacts with magnets, may be used.

The non-self-locking drive (for example a stepper motor with a steep thread) drives a locking bolt which has been displaced from the outer door leaf into the inner door leaf. The bolt receiver is correspondingly in the outer door leaf.

The locking protection may be dispensed with, since a closed door is reliably identified by the door closed sensor and only then locked. At the same time, the system may always activate the unlocked status if the door is not closed. If a user were to extend the lock if the door were not closed (extending the blocking element=locking) the unlocking process would be triggered by the system. The lock concept is simplified thereby.

The manual override is possible at any time from the public side by displacing the locking bolt. The locking bolt may be made accessible by lifting a flap.

The usual indication both in the public area and in the area to be locked remains in force, as described in "folding doors able to be operated manually".

Electromechanical Locking Mechanism—Single-Wing Door:

The electromechanical locking mechanism for single-wing doors is based on the following concept:

Mechanical door lock

Non-self-locking drive

At least one position sensor (locked and unlocked signal)

Optional: dedicated door locked sensor for aircraft (cabin management system: lighting and occupied sign)

The concept of the mechanical door lock is maintained in principle, as described in "single-wing doors which may be operated manually". A non-self-locking drive may mechanically suppress the door handle movement by the displacement of an inhibiting element (blocking element) into the blocked position. The door handle may not be pushed from the public area and the lock tongue (closing element) not retracted. For unlocking, the inhibiting element (blocking element) moves into the unblocked position in order to unblock the door handle movement again. The drive may additionally retract the lock tongue in order to permit a motorized opening of the door. The lock tongue is always returned by a spring into the extended status in order to hold the door in the closed status in the case of malfunction. Two mechanical alternatives A and B are conceivable:

Alternative A (Decoupling of Lock Knob):

The lock knob in the unlocked status is mechanically decoupled from the lock tongue which is why the drive moves the locking element and the lock tongue but not the lock knob. If the door handle is actuated in the unlocked status, the lock knob remains in the unlocked position.

Alternative B (Coupling of Lock Knob):

In this variant the lock knob is fixedly coupled to the locking element. For the "locked" status (blocked position) and "unlocked" status (unblocked position) the lock knob may also travel into an opened status (opening position).

Variant C (Integrated Closure Element and Locking Bolt):

In this variant the door is held in the closed position by a closure element (for example ball catch). A spring (for example a compression spring or torsion spring) pushes the closure element outwardly. The door may be opened manually on both sides. From the public area, the door may be pulled open by means of a handle element and pushed out of the area to be locked. The closure element unblocks the door movement as soon as a certain force has been overcome. The locking bolt (blocking element) is moved by the linear actuator and travels into the wall for the locking. In the unlocked status, the bolt is in the door. In order to facilitate an opening movement (in particular motorized) the closure element may be retracted electromechanically counter to the spring force. Similar to variants A and B, the drive which moves the locking bolt may retract the closure element in a third stage. To this end, the linear actuator once again retracts the locking bolt including the closure element counter to the spring force. The spring ensures that even in the de-energized status the door always travels/remains in the closed and unlocked status.

Variant D (Parallel Closure Element and Locking Bolt):

Same as variant C, but with the following changes:

The closure element is arranged parallel to the locking bolt in the door plane. The closure element may be retracted by the drive, by a coupling to the locking bolt, so that the door may be opened. Alternatively, a further actuator (for example electromagnet) may retract the closure element independently of the drive.

A dedicated door locked sensor may optionally be integrated in the electromechanical locking mechanism. Since in variants A to D components always travel into the wall, the conventional door switch may be used.

The following components/properties are designed similar to the "electromechanical locking mechanism folding door":

At least one position sensor (locked and unlocked signal)

Manual override (standard concept)

Indication (standard concept)

The following components are required for all door variants and variants A to D of the electromechanical locking mechanism:

Cable Transition:

The cable transition supplies the door/the inner door leaf with electrical power and ensures the signal communication. The cable transition is robust relative to vandalism and protects the cable running therein. A plug connection permits a rapid dismantling of the door.

Door Closed Sensor:

The door closed sensor provides the door closed signal in order to ensure locking when the door is exclusively closed. This signal may also be used in order to control the door actuation. A reed sensor with a magnet or end position switch such as a pushbutton, but also light barriers, may be used. By the electrification of the door, the sensor may be preferably integrated in the door since the relatively small magnet may be integrated more easily in the wall or guide rail of the lavatory door. Alternatively, the magnet could also be installed in the door and the sensor outside the door, i.e., in the guide rail or the wall.

Optional: Touchless Switch with Indication:

The touchless switch forms the interface between the user and door. In practice, the door lock may be operated by this touchlessly, i.e., a locking/unlocking may be initiated. An indication may display the function of the switch and optionally the status of the door lock. By the electrification of the door, this touchless switch may also be integrated in the door. This reduces the effort for integration in the lavatory. At the same time, the operating concept is more intuitive since the operating element is in the immediate vicinity of the conventional operating element, the lock knob.

Other features which are considered as characteristic for the invention are set forth in the appended claims.

Although the invention is illustrated and described herein as embodied in an aircraft door lock with drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
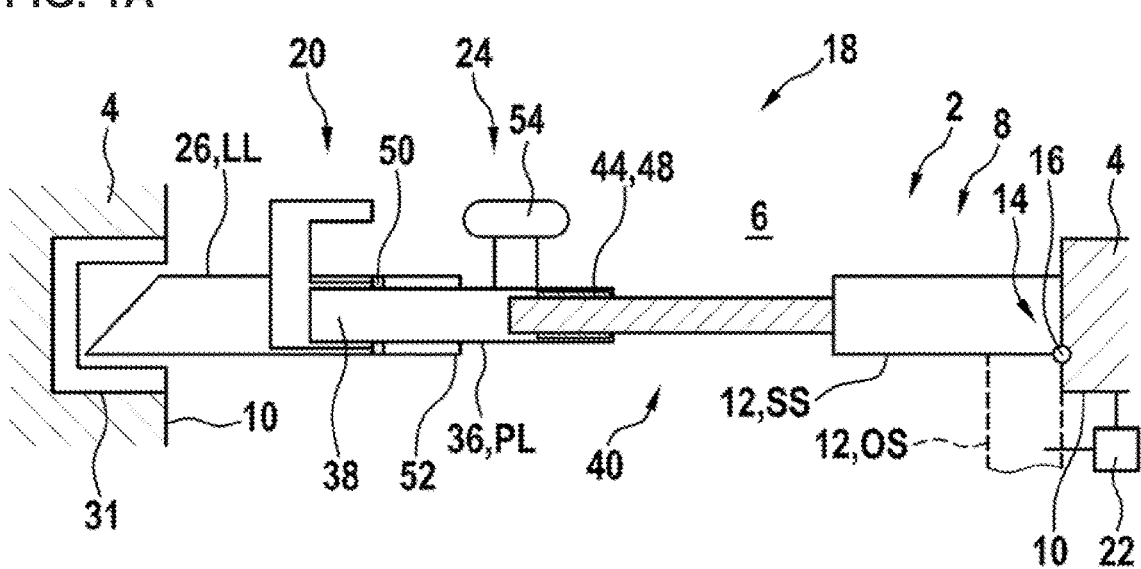
FIGS. 1A-1E show a horizontal cross section through a single-wing lavatory door with the lock module in FIG. 1A closed and locked, in FIG. 1B closed and unlocked, in FIG. 1C, variant A opened and unlocked, FIG. 1D, variant B opened and unlocked, and FIG. 1E manually opened and unlocked.

Referring now to the figures of the drawing in detail and first, in particular, to FIGS. 1A-1E thereof, there is shown a plan view from above a horizontal cross section through a detail of a space 2, in this case a washroom, also called a "lavatory," of an aircraft. The space 2 has a wall 4 which surrounds an interior 6 of the space 2. A door 8 is inserted in the wall 4. The door 8 contains a door frame 10, which is fixedly anchored in the wall 4, and a door leaf 12. In this case, the door 8 is a single-wing door, i.e., it has a single fixed door leaf 12. The door leaf 12 is mounted on the door frame 10 by means of a hinge 14 so as to be rotatable about a pivot axis 16. FIG. 1 shows a closed position SS of the door 8 in which the space 2 is closed by the door leaf 12. An open position OS of the door 8 or the door leaf 12 is also indicated in dashed lines, in which open position individuals are able to enter or leave the interior 6 of the space 2 through the door frame 10.

The door 8 contains a lock module 18 which is shown in FIG. 1 only in a detail. The lock module 18 contains, among other things, a module portion 20 of the door leaf 12. The module portion 20 is a spatial sub-region of the door leaf 12 in which the lock module 18 is arranged.

An electric door drive 22, which is indicated here only symbolically, serves for a movement in a motorized or automated manner, i.e., without manual intervention by a user, to and fro between the closed position SS and the open position OS with a corresponding activation of the door leaf 12.

The lock module 18 contains a lock 24.

Figure 1B:
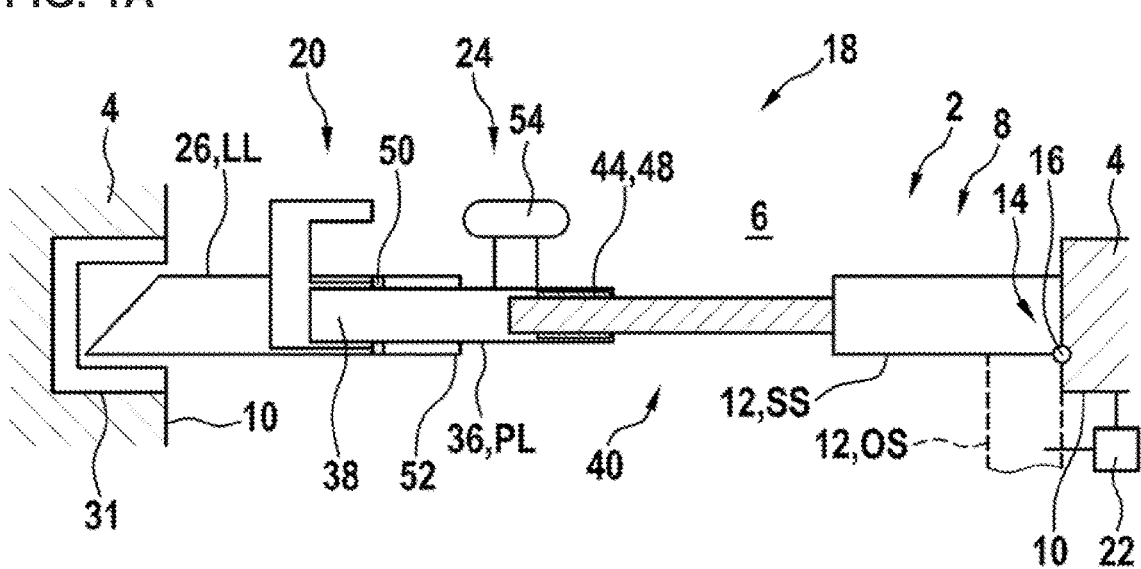
Figure 1C:
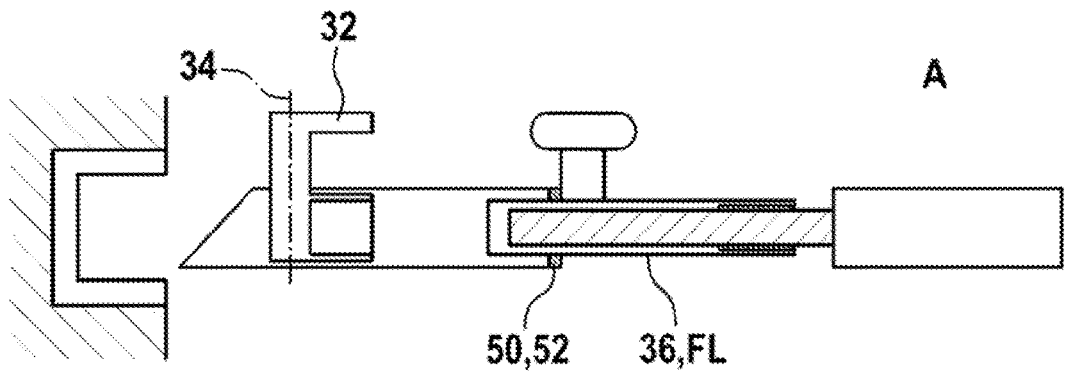
Figure 1D:
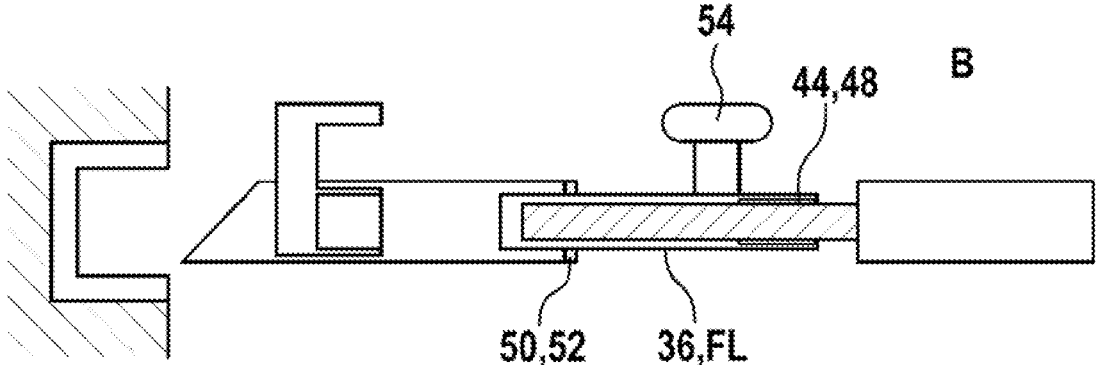
Figure 1E:
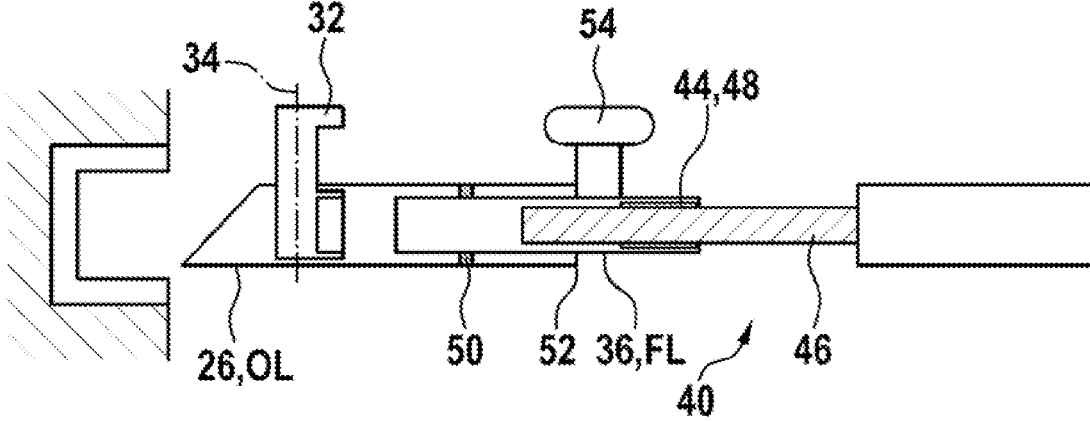

The lock 24 contains a mechanical closing element 26, in this case a lock tongue, which is able to be moved along a straight movement axis 28 in a linear manner along its own central longitudinal axis (which coincides with the movement axis 28) in or counter to the direction of the arrow 30 between a closing position LL (FIGS. 1A, 1B) and an opening position OL (FIGS. 1C-1E). A lock receiver 31 in the door frame 10 or the wall 4 serves to receive the closing element 26 in the closing position LL, according to FIGS. 1A, 1B, and thus to hold the door leaf 12 mechanically in the door frame 10 in the closed position SS.

A door handle 32 on the door leaf 12 is coupled in terms of movement to the closing element 26. FIGS. 1A-1D show the door handle 32 in a resting position. The door handle 32 may be pushed by the user by manual operation, by said door handle being rotated about a rotational axis 34. The door handle 32 has thus been moved into an actuating position. This is shown in FIG. 1E. By the coupling of the movement of the door handle 32 and the closing element 26 and the corresponding actuation of the door handle 32, the closing element 26 is pulled out of the closing position LL into the opening position OL. The door leaf 12 is unblocked and may be moved out of the closed position SS into the open position OS. When the door handle 32 is released, it returns from the actuating position into its resting position according to FIGS. 1A-1D. The closing element 26 immediately returns by the assistance of a spring (the spring is not shown here) into the closing position LL. Moreover, when the door 8 is closed, due to the lead-in chamfer thereof, not described in more detail, and the corresponding lead-in on the door frame 10 or the lock receiver 31, the closing element 26 may be automatically pushed back in the direction of the arrow 30. As soon as the door 8 has "clicked shut" the closing element 26 returns counter to the direction of the arrow 30 into the position shown in FIG. 1A; the door 8 is held again in the closed position SS.

The lock 24 also contains a blocking element 36, which in this case is a mechanical blocking bolt. This is also movable or displaceable along its central longitudinal axis, which coincides with the movement axis 28, between the blocked position PL shown in FIG. 1A and the unblocked position FL shown in FIG. 1B along the movement axis 28. The door handle 32 has a receiver 38 in which the blocking element 36 is inserted in the blocked position PL. By the insertion or a corresponding positive engagement, a rotation of the door handle 32 about the rotational axis 34 is prevented or inhibited. As the door handle 32 may not be actuated, the closing element 26 is prevented from being moved out of the closing position LL by the assistance of said door handle. Thus in this manner the door leaf 12 is also prevented from being able to be moved out of the closed position SS.

By moving the blocking element 36 into the unblocked position FL the blocking element 36 leaves the receiver 38, as shown in FIGS. 1B-1E. A rotational movement of the door handle 32 about the rotational axis 34 is possible, and thus the movement of the closing element 26 out of the lock receiver 38 and the opening of the door 8 are possible.

The lock 24 also contains a non-self-locking drive 40, in this case a linear drive, which here is coupled in terms of movement both to the blocking element 36 and to the closing element 26: by actuating the drive 40 the closing element may be moved in a motorized manner to and fro between the blocked position PL and the unblocked position FL. Moreover, the closing element 26 may be moved out of the closing position LL into the opening position OL and also unblocked from the opening position OL, so that the closing element 26 may return or returns again into the closing position LL independently, namely by its above-mentioned spring characteristic.

The coupling in terms of movement is implemented as follows: the drive 40 has a fixing end 42 and an output end 44. The fixing end 42 is fixedly anchored in the door leaf 12. Moreover, a spindle 46 with a spindle nut 48 which is rotatable relative to the fixing end 42 is provided so that the spindle nut 48 forms the output end 44 which is movable relative to the door leaf 12. The spindle nut 48 in turn is fixedly connected to the blocking element 36. A rotation of the spindle 46 thus always leads to a forced movement of the output end 44 and thus of the blocking element 36 in or counter to the direction of the arrow 30 relative to the door leaf 12.

The blocking element 36 is freely movable between the positions shown in FIGS. 1A and 1B inside or relative to the closing element 26, so that it may be retracted into or extended out of the receiver 38. If, however, the spindle nut 48 is moved further in the direction of the arrow 30, starting from FIG. 1A via the position shown in FIG. 1B, a driver element 50 on the blocking element 36 engages behind a counter element 52 on the closing element 26 and entrains this counter element therewith in the direction of the arrow 30. Thus the closing element 26 is pulled out of the closing position LL until it has finally left the lock receiver 31 according to FIGS. 10, 1D and the door leaf 12 is unblocked, in order to be moved out of the closed position SS. An actuation of the door handle 32 is not necessary here. Both the locking and unlocking of the door 8 and the unblocking of the door leaf 12 take place in a motorized manner by actuating the drive 40.

The blocking element 36 also has a manual operating element 54, here in the from of an operating knob. A user may act manually on the operating element 54 in order to move the blocking element 36 and thus to lock or unlock the door 8 manually. According to FIGS. 1A, 1B the operating element 54 adopts two different positions, a user also being able to identify thereby whether the door 8 is locked or unlocked. In a first variant A which is shown in FIG. 10, the operating element 54 runs freely, not described in more detail, relative to the blocking element 36. If the blocking element 36 is thus displaced further in a motorized manner by the drive 40 in the direction of the arrow 30, starting from FIG. 1B to FIG. 10, the operating element 54 does not follow this movement and continues to display the same ("unlocked") position to a user as in FIG. 1B. In a second variant B according to FIG. 1D, however, the operating element 54 is fixedly connected to the blocking element 36 and thus also follows the corresponding movement of the blocking element 36 by a further displacement in the direction of the arrow 30 starting from FIG. 1B to FIG. 1D.

Further components of the lock module 18 are not shown in FIGS. 1A-1E for the sake of clarity, but only shown in the further figures.

Figure 2:
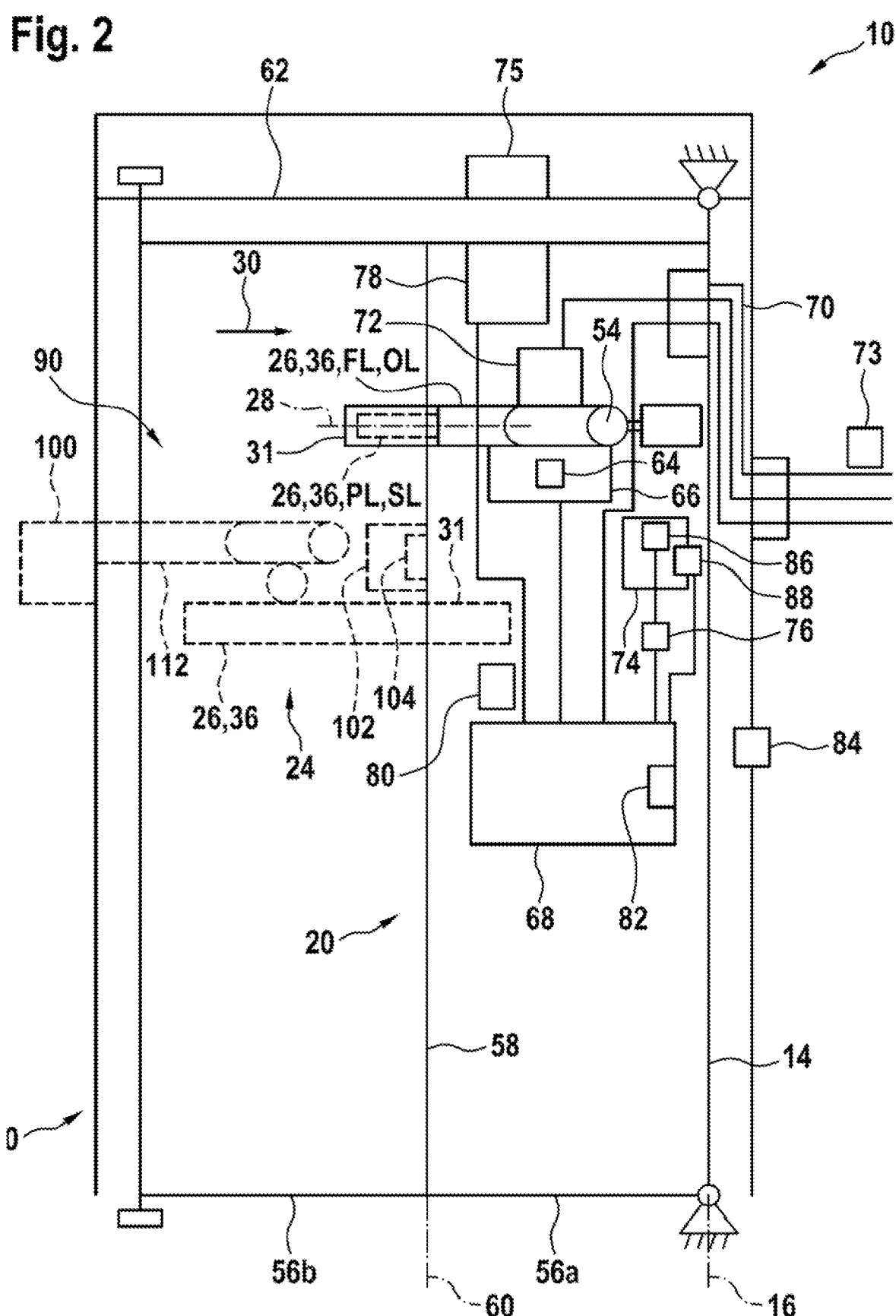
FIG. 2 shows a diagrammatic internal view of a double-wing lavatory door with the alternative lock module and additionally with the door lock according to the prior art.

FIG. 2 shows, in a view from the interior 6 of the space 2, an alternative door 8. The alternative, instead of a rigid single-wing door leaf 12, has a two-part door leaf 12 which is a folding door. The door leaf 12 thus has two partial leaves 56a, b. These partial leaves are connected together rotatably or in an articulated manner via a central hinge 58 about the rotational axis 60. The partial leaf 56a is an "inner" partial leaf since this in turn is attached to the door frame 10 by means of a hinge 14 so as to be rotatable about the pivot axis 16. The partial leaf 56b, however, is an "outer" partial leaf which is not directly articulated on the door frame 10. Instead, this outer partial leaf is guided in a guide rail 62 in a linear manner in the door frame 10.

In the lock 24, the closing element 26 and the blocking element 36 coincide in this case to form a single identical element. Hereinafter for the sake of simplicity only one of these elements is mentioned, when the common component is discussed. This component may be transferred between the opening position OL shown in FIG. 2, which is the same as the unblocked position FL, into the closing position LL indicated in dashed lines, which is the same as the blocked position PL. The blocking element 36 as in FIGS. 1A-1E is movable in a linear manner along a straight line, along its central longitudinal axis and a movement axis 28 coinciding therewith. The blocking element 36 is movably guided in linear translation exclusively on the door leaf 56a. Also in this case, the blocking element 36 again has a manual operating element 54 which is fixedly arranged thereon according to variant B shown in FIG. 1D.

The movement of the blocking element 36 is carried out as in FIGS. 1A-1E by a fixed coupling of the movement with the drive 40.

The lock receiver 31 for the closing element 26 is arranged in the partial leaf 56b. In the closing position LL the closing element 26 is inserted in the lock receiver 31, in the opening position OL it is fully extended out of said lock receiver. Thus in the closing position LL a relative movement of the partial leaves 56a, b about the rotational axis 60 is inhibited and the door 8 is both closed and locked. In the opening position OL, however, the door 8 is not closed and is unlocked.

A further component of the lock module 18 is a blocking sensor 64. This sensor is designed in this case as a position sensor and serves for receiving the current position or location of the blocking element 36 (during the course of its movement along the movement axis 28) relative to the partial leaf 56a and thus also for detecting the blocked position PL and the unblocked position FL. The blocking sensor 64 outputs the correspondingly detected position as a blocking signal 66.

A further component of the lock module 18 is a control unit 68. This control unit is connected by signal technology to the blocking sensor 64 and the drive 40, in order to control the drive on the basis of the blocking signal 66. In particular, the blocking element 36 in each case may be respectively moved or driven in or counter to the direction of the arrow 30, until it has reached the desired blocked position PL or unblocked position FL.

The partial leaf 56a thus has the module portion 20, indicated only symbolically here. This is the spatial region of the partial leaf 56a in which the components, namely the lock 24, drive 40, blocking sensor 64 and control unit 68, are structurally integrated.

The door 8 has a cable transition 70 between the door leaf 12, in this case the door leaf 56a, and the remainder of the aircraft, in this case the wall 4. Electrical and other cables which serve for the power supply, communication etc. of the lock module 18 or the door leaf 12 with the remaining aircraft are guided through the cable transition 70 in a protected manner.

In the present case the lock module 18 also has an external sensor 72. This external sensor is also structurally integrated in the module portion 20 but not connected by signal technology to the control unit 68. A cable leading away from the external sensor 72 is thus guided through the cable transition 70 without passing through the control unit 68. The external sensor 72 in this regard is a redundant, separate "door locked sensor" relative to the blocking sensor 64, which establishes and outputs by signal technology whether the blocking element 36 is in the blocked position PL or the unblocked position FL, thus whether the door 8 is locked or unlocked. This is required for safety aspects on the part of the aircraft and should not be replaced by the functionality of the blocking sensor 64.

The lock module 18 also contains a command sensor 74 which in turn is connected by signal technology to the control unit 68. The command sensor 74 is also arranged in the module portion 20. The command sensor 74 serves for detecting a door command 76 correlated with the lock module 20 and delivered by a user. The command sensor 74 in this case is configured to be touchless, i.e., a "touchless switch" in order to operate the door 8 touchlessly, namely, to lock or to unlock the door by means of the drive 40 and to unblock the door for the opening and to open and to close the door via the door drive 22 in a motorized manner.

The lock module 18 also contains an additional sensor 78 which in turn is connected by signal technology to the control unit 68. The additional sensor 78 is also arranged in the module portion 20. The additional sensor 78 is a "door closed sensor" which interacts with a magnet 75 on the guide rail 62 and establishes, and outputs by signal technology, whether the door leaf 12 is in the closed position SS or not. In this regard, a door status 80 (closed position SS or not) is detected and made available to the control unit 68. By the processing of the corresponding sensor signal in the control unit 68 a device for preventing misuse of the lock 24 may be implemented, namely such that the blocking element 36 is prevented from being moved by the drive 40 into the blocked position PL when the door 8 is not in the closed position SS. On the other hand—if the blocked position PL has been manually set—this may be detected and the blocking element 36 in this situation may be always moved by the drive 40 into the unblocked position FL.

The door status 80, or an emulation signal 84 correspondingly correlated therewith, is required in the aircraft. In the previous solutions, this emulation signal 84 was generated by a separate, dedicated sensor, not shown here, ("door switch" 100 see below) in the door frame 10. This sensor is, however, not present here. The control unit 68 thus has an emulation interface 82. This generates or emulates the door switch 100 or the emulation signal 84 at its emulation interface 82 on the basis of the data available in the control unit 68. In this case, this data is the data delivered by the additional sensor 78 (different from the door switch 100) in the form of the door status 80. Thus the emulation signal 84 may be supplied to the aircraft for further use; the door switch 100 is obsolete or replaced.

The lock module 18 also contains a display element 86 for displaying status information 88 correlated with the lock module 18, in this case the current position which the blocking sensor 64 detects: blocked position PL or opening position OL. To this end, the display element 86 is connected by signal technology to the control unit 68 and obtains therefrom the corresponding status information 88 generated here from the blocking signal 66 of the blocking sensor 64.

Since in the present case the command sensor 74 is designed as a "touchless switch", the display element 86 is integrated therein. Thus a "touchless switch with indication" or a "touchless switch with display" is produced as a whole.

In a non-illustrated alternative embodiment the control unit 68 is not arranged in the door leaf 12 or in the module portion 20 but arranged outside the door leaf 12 or the door 8, in this case in the wall 4. The corresponding cables out of the door leaf 12 to and from the sensors, etc. and to and from the control unit, are thus guided through the cable transition 70 and away from the door leaf 12, but the wiring is the same.

The door leaf 12 in FIG. 2 is a folding door leaf which replaces a door leaf previously installed in the aircraft. This door leaf has a further lock module known from practice, which is shown here in dashed lines, and generally denoted by the arrow 90. In this case, the lock 24 was arranged in the outer partial leaf 56b. The closing element 26/blocking element 36 was arranged in the partial leaf 56b and inserted into a lock receiver 31 in the inner partial leaf 56a. An additional bolt 112 was coupled in terms of movement via a complex mechanical reduction gear to the closing element 26/blocking element 36 and at the same time inserted into a sensor receiver in the door frame 10, the already mentioned "door switch" 100. A motorized drive was not provided here. An additional mechanical locking protection 102 was connected via a complex mechanism, said locking protection being arranged in the partial leaf 56b and being implemented by a mechanical blocking part 104 which in the closed position SS was pushed-in. As a result, in the non-closed status, the locking of the door was purely mechanically prevented.

Figures 3A, 3B:
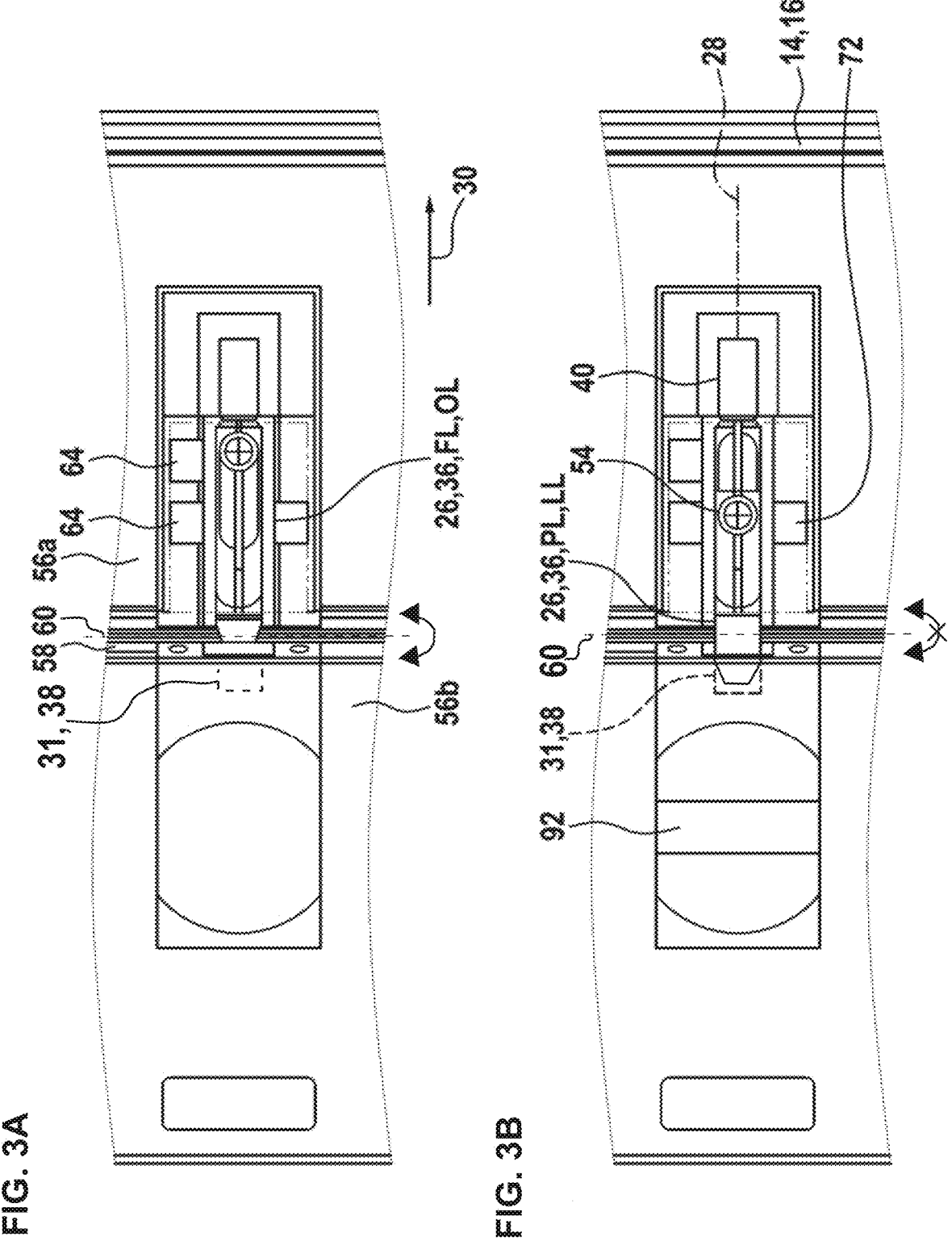
FIGS. 3A and 3B show a partially transparent view of the lock of FIG. 2 in a more detailed view, with FIG. 3A unlocked and FIG. 3B locked.

FIGS. 3A and 3B show an alternative or more detailed embodiment of the lock 24 of FIG. 2, proposed in the present case, again in a view from the interior 6 of the space 2. Corresponding to the above, the components of the lock 24 are accommodated in the inner partial leaf 56a. In contrast to the above, however, two blocking sensors 64, which in each case serve as end position sensors for the blocked position PL and the unblocked position FL, are provided here.

Only a rigid handle 92 is located on the outer partial leaf 56b in order to be able to pull and thus open the folding door leaf 12 or the door 8 by hand toward the interior 6, as desired or in an emergency.

In all other aspects, the embodiment of FIGS. 3A and 3B correspond to the embodiments of FIGS. 1A-1E and FIG. 2, and all above-mentioned features and advantages expediently apply here as well.

Figures 4A, 4B, 4C:
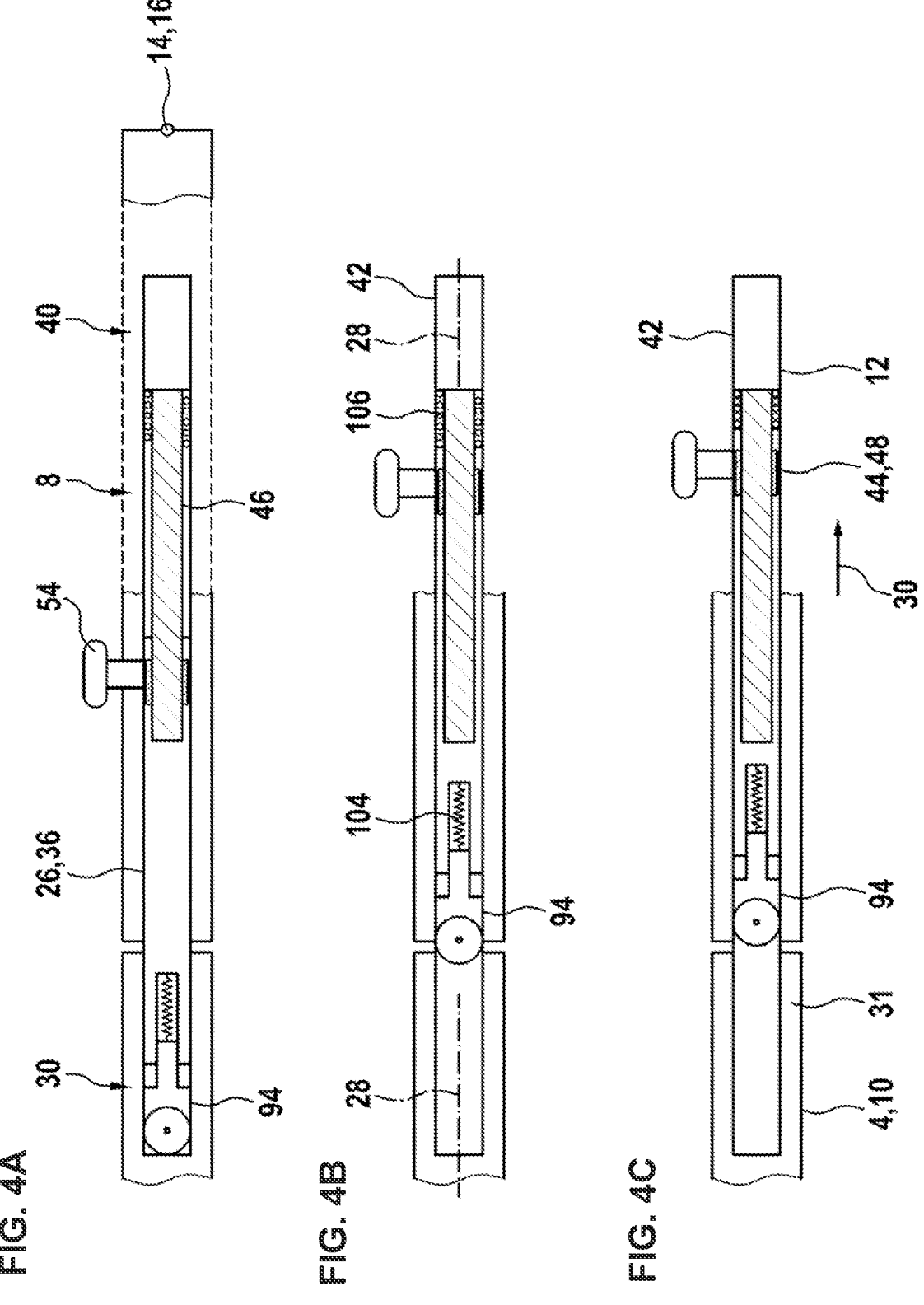
FIGS. 4A-4C show a view similar to FIG. 1 of an alternative lavatory door with the closure element in FIG. 4A closed and locked, in FIG. 4B closed and unlocked, and in FIG. 4C opened and unlocked.

FIGS. 4A-4C illustrate a view similar to FIGS. 1A-1E of an alternative embodiment for a lock module 18 in a single-wing door 8, here in a variant C. The closing element 26 here is a closure element 94 in the manner of a ball catch which latches into the lock receiver 31, which is spring-assisted (spring, ball catch function) and is mounted so as to be displaceable in a linear manner on the blocking element 36 in the direction of the movement axis 28. For locking the door, the blocking element 36 itself travels into the lock receiver 31 in the door frame 10 (FIG. 4A), and out of said lock receiver for the unlocking (FIGS. 4B, 4C).

According to the position in FIG. 4B, the ball catch is functional, i.e., the door leaf may be moved out of or into the closed position SS by overcoming the force of the spring 104. By pulling the operating element 54 in the direction of the arrow 30 or actuating the drive 40, the ball catch may be released or the function thereof neutralized (FIG. 4C). Assisted by a spring 106, however, the arrangement returns to its position according to FIG. 4B so that in the de-energized status (malfunction of the drive 40) the ball catch is still functional and holds the door in the closed position SS.

Figure 5A:
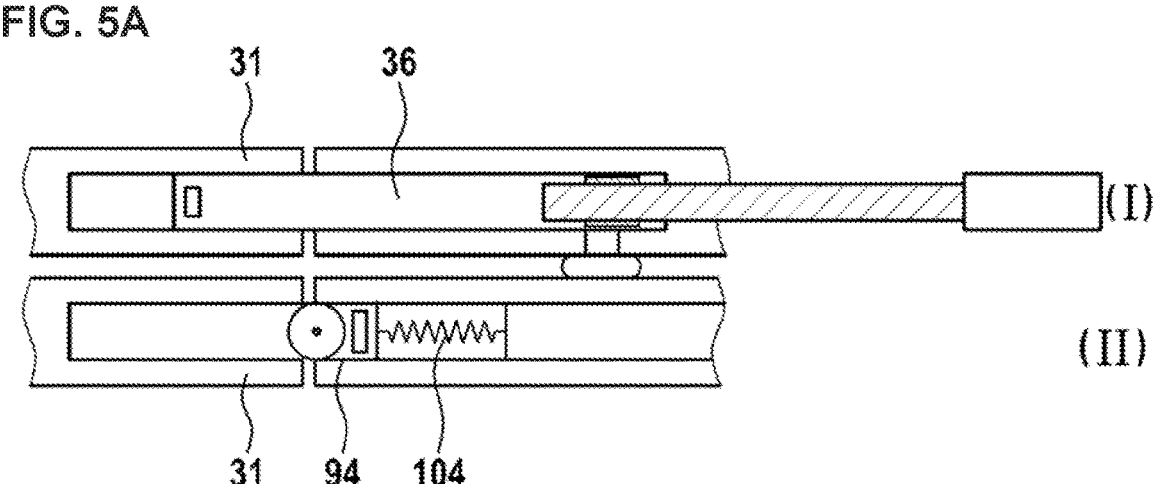
FIGS. 5A-5C show a view similar to FIG. 1, in a second section plane, of an alternative lavatory door with the alternative closure element in FIG. 5A closed and locked, in FIG. 5B closed and unlocked, in FIG. 5C opened and unlocked, and the option of a separate activation of the closure element by actuator.
Figure 5B:
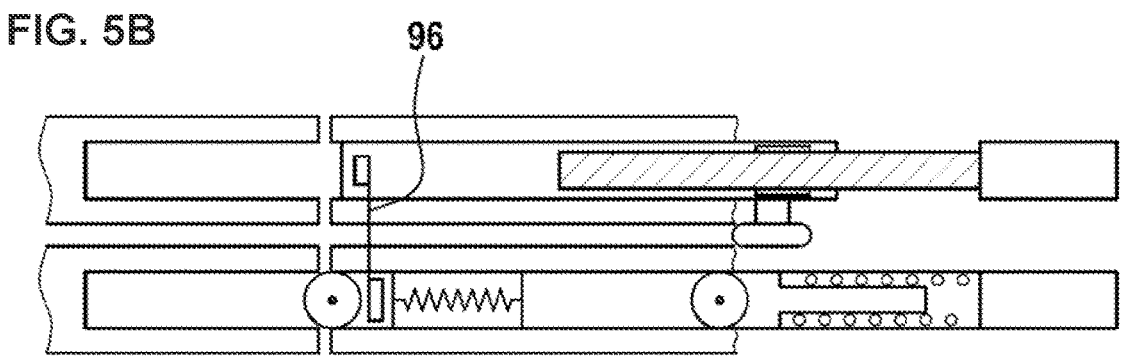
Figure 5C:
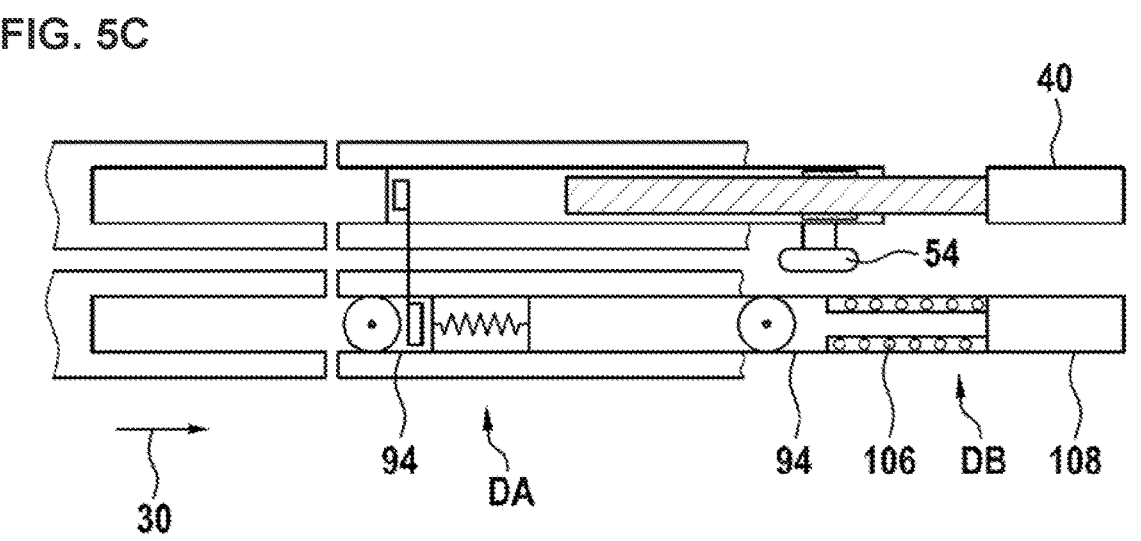

FIGS. 5A-5C show a variant D of this embodiment, each in two sections (I) and (II) taken through the door 8 at different height levels adjacent one another. In other words the closure element 94 is actually arranged "below" the blocking element 36. The ball catch is thus not integrated in the blocking element 36. A coupling, which is indicated here only symbolically by means of a coupling element 96, thus actually acts downwardly in the vertical direction (differently from that shown symbolically here); as soon as the blocking element 36 is moved out of the lock receiver 31 (transition from FIGS. 1A to 1B) the coupling element 96 in the manner of a driver element starts to pull back the closure element 94 from the, or a corresponding, second lock receiver 31 in the door frame 10, so that according to FIG. 5C (corresponding to FIG. 4C) an opening/closing of the door leaf 12 relative to the closed position SS is possible virtually without force; the spring resistance of the closure element 94 (ball catch functionality) thus no longer has to be overcome. The spring 104 is again part of the ball catch functionality. All this corresponds to a variant DA in FIG. 5C.

In a variant DB in FIGS. 5B and 5C the closure element 94 is designed alternatively: here a further actuator 108 is provided, in this case an electromagnet, which is able to retract the closure element 94 in the direction of the arrow 30 counter to the spring 104 (FIG. 5C). Thus the coupling element 96 may be dispensed with and, if required, the closure element 94 may be deactivated in its snap functionality, independently of the drive 40.

Figure 6A:
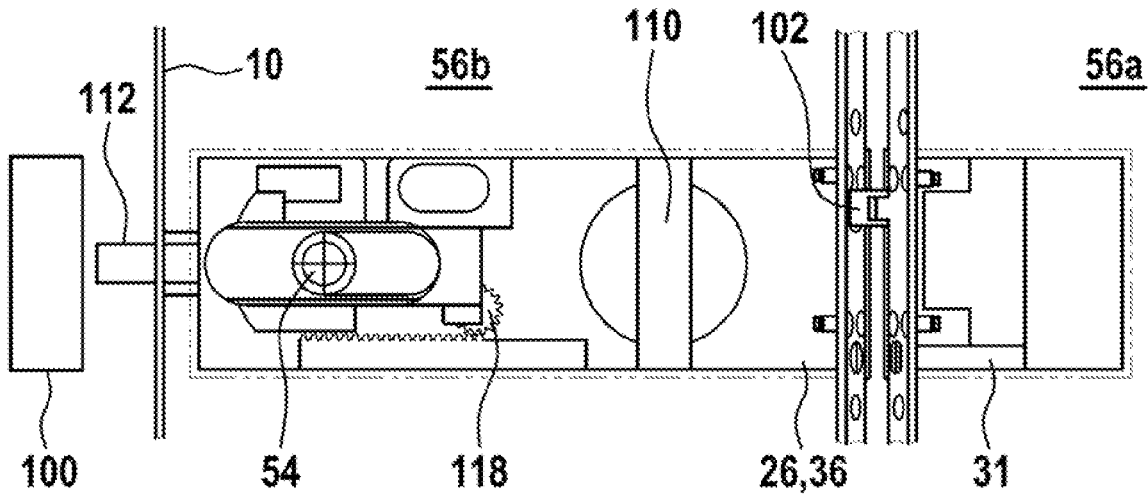
FIGS. 6A and 6B show a partially transparent view of a door lock according to the prior art for a folding door, with FIG. 6A from the interior and FIG. 6B from the outside.
Figure 6B:
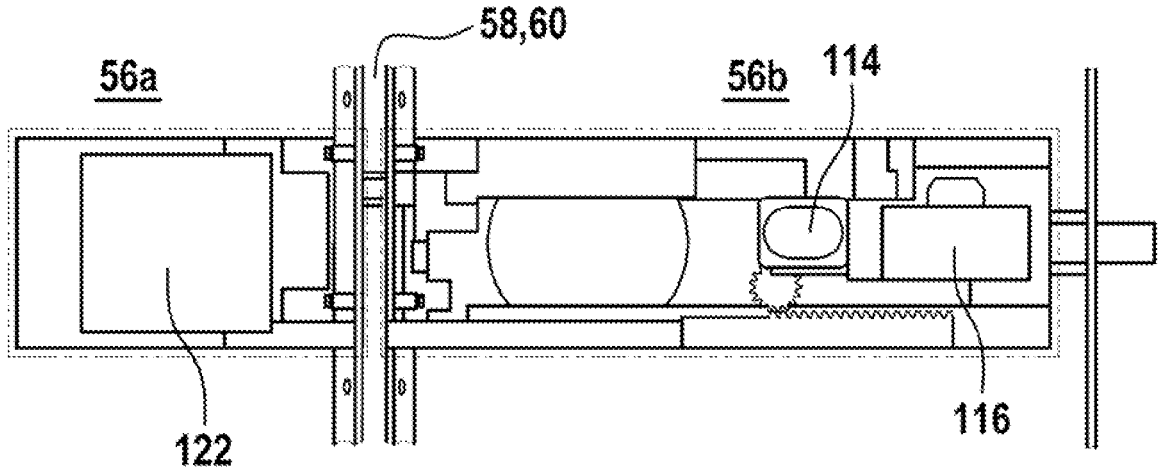

FIGS. 6A and 6B show a prior art lock 24, which is indicated in dashed lines in FIG. 2, in further detail or more precisely. FIG. 6A shows the view from the interior 6, and FIG. 6B shows the view from outside. In particular, a rotary handle 110 for operating the lock 24 may be identified here. The complex mechanical transfer/coupling (indicated at 118) of the rotational movement thereof leads to the movement of the blocking element 36/closing element 26 into or out of the lock receiver 31, and of a further bolt 112 for travelling into the door frame 10 or for operating the "door switch" 100. The purely mechanical locking protection with the corresponding bolt 114 is indicated. In FIG. 6B a mechanical status display 114 which is visible from outside for the blocked position PL/unblocked position FL (door locked) and a flap 116 may be seen, the "manual override" being concealed there-behind in order to be able to unlock the door 8 also from the outside—for example by cabin personnel. A push plate 122 serves for opening the door 8 from the outside.

Figure 7A:
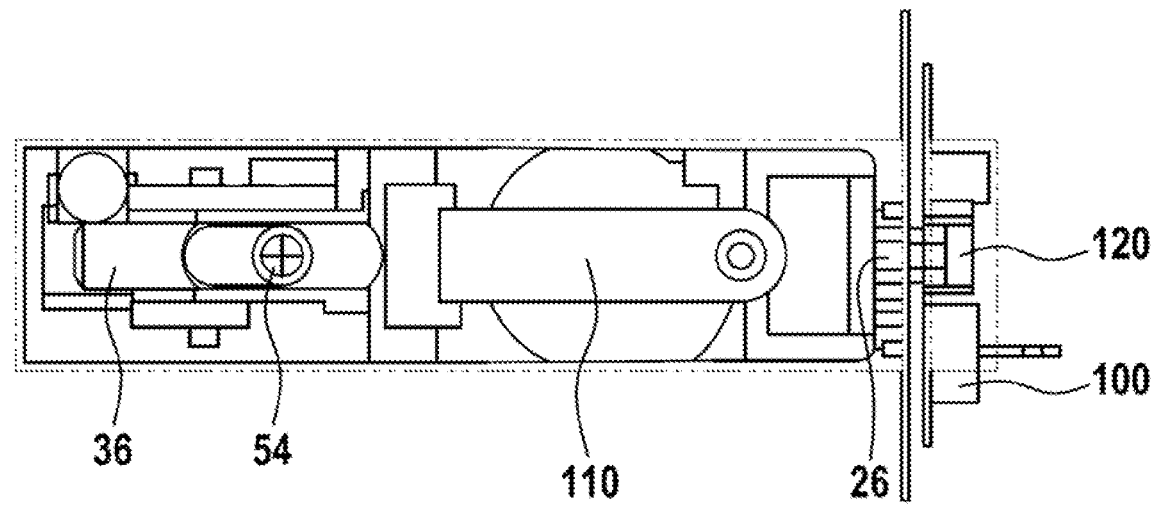
FIGS. 7A and 7B show a view similar to FIGS. 6A and 6B of a door lock according to the prior art for a single-wing door, with FIG. 7A from the interior and FIG. 7B from outside.
Figure 7B:
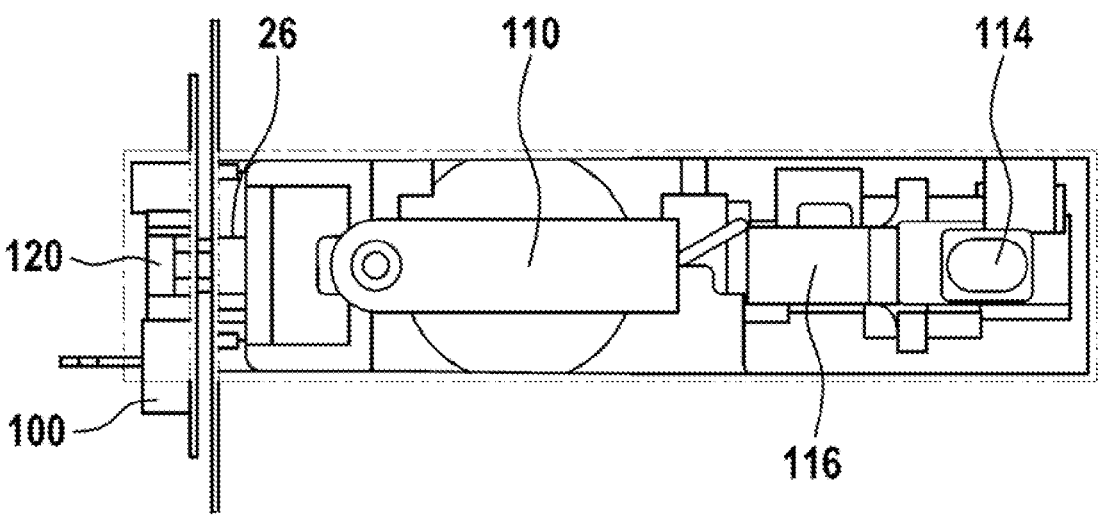

FIGS. 7A and 7B show, in similar views as FIGS. 6A and 6B, a prior art lock 24 for a single-wing door. In this case, it is also a purely mechanical lock, the "door switch" 100 here is directly actuated by the closing element 26, wherein this closing element—here in the form of a lock tongue—in a manner not described in more detail contains a movable part 120 which serves for actuating the door switch 100 and thus for generating the "door locked" signal. The mechanical locking protection, in a manner not described in more detail here, is in turn implemented internally by a complex mechanism in the lock 24. The rotary handle 110 in FIGS. 6A, 6B, 7A, and 7B corresponds to the door handle 32 of FIGS. 1A-1E, in its functionality of opening the door 8 from the closed position SS.

The following is a summary list of reference numerals and the corresponding structure used in the above description of the invention:

2 Space
4 Wall
6 Interior
8 Door
10 Door frame
12 Door leaf
14 Hinge
16 Pivot axis (door leaf)
18 Lock module
20 Module portion
22 Door drive
24 Lock
26 Closing element
28 Movement axis
30 Arrow
31 Lock receiver (closing element)
32 Door handle
34 Rotational axis (door handle)
36 Blocking element
38 Receiver (door handle, blocking element)
40 Drive
42 Fixing end
44 Output end
46 Spindle
48 Spindle nut 50 Driver element
52 Counter element
54 Operating element, manual
56a, 56b Partial leaf (internal, external)
58 Central hinge
60 Rotational axis (central hinge)
62 Guide rail
64 Blocking sensor
66 Blocking signal
68 Control unit
70 Cable transition
72 External sensor
73 External signal
74 Command sensor
75 Magnet
76 Door command
78 Additional sensor
80 Door status
82 Emulation interface
84 Emulation signal
86 Display element
88 Status information
90 Arrow
92 Handle
94 Closure element
96 Coupling element
100 Door switch
102 Locking protection (mechanical)
104 Spring
106 Spring
108 Actuator
110 Rotary handle
112 Bolt
114 Status display
116 Flap
118 Coupling
120 Part
122 Push plate
SS Closed position
OS Open position
LL Closing position
OL Opening position
PL Blocked position
FL Unblocked position

The invention claimed is:

1. A lock module for a door for a space of an aircraft, wherein the door has a door frame and a door leaf which is movable between an open position unblocking the door frame and a closed position closing the door frame, the lock module comprising:

a lock having a mechanical closing element mounted for movement into a closing position in which the door leaf is held in the closed position and for movement into an opening position in which the door leaf is enabled to be moved out of the closed position;

said lock having a blocking element mounted for movement into a blocked position in which movement of said closing element out of the closing position is prevented and into an unblocked position in which movement of said closing element out of the closing position is enabled; and said lock having a non-self-locking drive which is coupled in terms of movement at least to said blocking element in order to move said blocking element between the blocked position and the unblocked position, and said drive being structurally connected to said closing element and configured to move said closing element out of the closing position into the opening position;

at least one blocking sensor for detecting the blocked position and the unblocked position of the blocking element and for generating a corresponding blocking signal;

a control unit connected to said at least one blocking sensor and said drive, said control unit being configured to activate said drive based on the blocking signal of said at least one blocking sensors; and at least one module portion being a physical sub-region of the door leaf, said lock, said drive, and said blocking sensor are structurally integrated in said module portion.

2. The lock module according to claim 1, wherein the door leaf has at least two partial leaves which are connected together in an articulated manner by a central hinge and said closing element is configured, in the closing position, to fix the partial leaves relative to one another, to inhibit a movement on the central hinge in order to hold the door leaf in the closed position.

3. The lock module according to claim 2, wherein said lock and lock module do not have a bolt element disposed to act between at least one of the partial leaves and the door frame and to selectively hold the door leaf on the door frame in the closed position.

4. The lock module according to claim 1, wherein the door leaf is a single leaf, and wherein said closing element is configured in the closing position to fix the single leaf in the closed position relative to the door frame, so that a movement out of the closed position relative to the door frame is inhibited.

5. The lock module according to claim 1, further comprising at least one external sensor configured to identify a door status and to output an external signal correlated with the door status, wherein said external sensor is structurally integrated in said module portion and is not connected by signal technology to said control unit.

6. The lock module according to claim 1, further comprising at least one command sensor for detecting a door command correlated with said lock module and/or at least one additional sensor for detecting a door status, wherein said at least one command sensor and said at least one additional sensors are connected by signal technology to said control unit and are structurally integrated in said module portion.

7. The lock module according to claim 6, wherein at least one of said blocking element or said closing element has a manual operating element for manually changing a position thereof and said command sensor is arranged in an immediate vicinity of said operating element.

8. The lock module according to claim 1, further comprising at least one display element for displaying status information correlated with the lock module, wherein said display element is structurally integrated in said module portion and is connected by signal technology to said control unit.

9. The lock module according to claim 1, wherein said control unit has at least one emulation interface with the aircraft and is configured to provide thereon an aircraft-specific emulation signal which is correlated with the door and which is generated on a basis of data available in said control unit.

10. A door for a space of an aircraft, the door comprising:
a door frame and a door leaf mounted to said door frame;

a lock module according to claim 1, and wherein said door leaf contains the module portion.

11. The door according to claim 10, further comprising a door drive configured to move said door leaf between the open position and the closed position.

12. An enclosed space in an aircraft, comprising:

a wall surrounding an interior of the space, said wall containing at least one door;

said door having a door frame and a door leaf mounted to said door frame; and said door having a lock module according to claim 1, and wherein said door leaf contains the module portion.

13. The space according to claim 12, configured as a washroom of an aircraft, with said door being a washroom door.

14. The lock module according to claim 1, wherein:

said drive is a non-self-locking drive and said blocking element is configured for manual operation at any time, wherein said blocking element and said drive are actuated simultaneously by a manual movement of said blocking element; and said blocking element includes manual operating element, enabling a user to act manually on said operating element to move said blocking element for selectively locking or unlocking the door manually.

\* \* \* \* \*

28